3,081,294
HALOGEN-CONTAINING HYDROCARBON POLYMERS

John H. Beynon, Chester, and Charles B. Milne, Little Sutton, Wirral, England, assignors to Shell Oil Company, New York, N.Y., a corporation of Delaware
No Drawing. Filed June 21, 1960, Ser. No. 37,572
Claims priority, application Great Britain Oct. 15, 1959
7 Claims. (Cl. 260—139)

The present invention relates to the preparation of hydrocarbon polymers which can be used as synthetic lubricating oils. More particularly it relates to a process for the preparation of synthetic lubricants having high viscosity indices and extreme pressure properties.

The polymerization of olefins with the so-called "Ziegler catalyst" is known. However, when using the usual proportions of the two catalyst components, the products obtained only have mediocre viscosity indices and no more than average load-bearing capacity.

It is an object of this invention to provide a process for the production of improved synthetic lubricants. It is another object of the invention to provide a process for the production of synthetic lubricants having improved viscosity indices and extreme pressure properties. Other objects will become apparent from the following description of the invention.

Now, in accordance with this invention, it has been discovered that hydrocarbon polymers suitable as lubricating oils and in addition having good extreme pressure properties can be prepared by a process in which an olefin having in the molecule at least 6 carbon atoms but not more than 18 carbon atoms is polymerized in the presence of a catalyst comprising components A and B (as hereinafter defined), the mole ratio of component B to component A being at least 0.05:1 but less than 1:1, and the polymer is contacted with a halogenating agent or sulfohalogenating agent.

By virtue of the work started by K. Ziegler the catalyst used is usually referred to as a Ziegler catalyst and the polymerization or co-polymerization process as the "Ziegler process." The Ziegler process is carried out using two classes of compounds which may be referred to as components A and B. The catalyst used in the process of the present invention is formed by mixing at least one component A with at least one component B as defined below.

In this specification component A is defined as a salt of a metal of groups 4a, 5a, 6a or 7a of the periodic classification of elements or a compound of iron, e.g., ferric chloride, although the compound is more suitably an inorganic compound for example a halide, or oxyhalide of groups 4a or 5a. It is preferred, however, that compound A should comprise a chloride, bromide, iodide or oxychloride of a group 4a or 5a metal particularly titanium, tin or lead, for example tin tetrachloride or lead tetrachloride. The most preferred compound is titanium tetrachloride, although the chlorides or oxychlorides of, for example, zirconium and vanadium, e.g., vanadium oxychloride, can be used but resulting in reduced yields. It is also preferable that the compounds which are used as component A are ones which are liquid at normal temperatures and pressures and one in which the metal present in the compound is in its highest valency state.

Component B is an aluminum compound of the general formula $R_1R_2AlX$ in which $R_1$ and $R_2$ are similar or dissimilar and each represents a hydrogen atom or a hydrocarbon radical such as an alkyl, alkaryl, aryl, aralkyl, alkenyl, alkynyl, cycloalkyl or cycloalkenyl radical and X represents a hydrogen atom, a halogen atom, an alkoxy group or an aryloxy group. X may also represent the residue of a secondary amine or amide, carboxylic acid or sulfonic acid; but the yields so obtained from the polymerization, in general, are not so great.

Included among the above listed preferred compounds of aluminum are those commonly known as the aluminum sesqui halides which can be considered as equimolecular mixtures of for example, the dialkyl aluminum halide and the alkyl aluminum dihalide and may be represented by the general formula $R_1R_2R_3Al_2X_1X_2X_3$ where $R_1$, and $R_2$ and $R_3$ are similar or dissimilar hydrocarbyl radicals and $X_1$, $X_2$ and $X_3$ are similar or dissimilar halogen atoms.

Examples of such aluminum compounds are: aluminum triethyl, diethyl aluminum bromide, dimethyl aluminum hydride, phenoxydiethyl aluminum, dimethylaminodiethyl aluminum, piperidyldiethyl aluminum (methylcyclohexylamino)-diethyl aluminum (N-methylamino)-diethyl aluminum, diisobutyl aluminum benzoate, ethyl aluminum dichloride and ethyl aluminum sesqui-chloride.

The most preferred aluminum compounds are those in which the alkyl group has less than 6 carbon atoms, for example aluminum triethyl or aluminum diethyl chloride or bromide, the particularly preferred compound being aluminum triethyl, although aluminum triisobutyl can be used.

The process of the present invention is particularly applicable to those olefins obtained by the thermal or catalytic cracking of hydrocarbon feedstock, such as that produced in the refining of crude petroleum oils. Such olefins that are commonly known as cracked wax olefins are particularly preferred. Other preferred olefins are those known as cracked raffinate olefins which are obtained from the cracking of the raffinate obtained by the selective solvent extraction of heavy catalytically cracked cycle oil. The selective solvent should be a selective solvent for aromatic compounds, preferably liquid sulfur dioxide or furfural although other selective solvents for aromatic compounds, for example benzene, nitrobenzene, phenol or a mixture of any two or more such solvents may also be used. Both cracked wax olefins and cracked raffinate olefins can be fractionally distilled to obtain the cuts containing the individual olefins.

Other olefins which can be used are those produced by the polymerization of lower molecular weight olefins, for example propylene or butylene or mixtures of propylene and butylene. They may also, for example, be those obtained by the dehydration of suitable alcohols or alcohol mixtures.

The process of the present invention is suitable not only for olefins having the same number of carbon atoms in the molecule, but is also suitable for mixtures of such olefins, for example mixtures of $C_6$ to $C_8$, $C_9$ to $C_{13}$, $C_9$ to $C_{17}$ and $C_{14}$ to $C_{18}$ olefins. Particularly preferred mixtures of olefins are cracked wax olefins and cracked raffinate olefins.

When polymerizing cuts containing substantially only olefins having the same number of carbon atoms and not mixtures of olefins it is preferable to use an olefin having not more than 16 carbon atoms in the molecule.

In general, the preferred olefins are those olefins or mixtures of olefins consisting entirely of straight-chain alpha olefins or a large proportion of such olefins. When using a low catalyst component (B:A) mole ratio particularly not more than 0.6:1, it is also possible to use olefins or mixtures containing a large proportion of olefins of the general formula

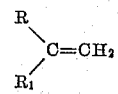

wherein R and $R_1$ are similar or dissimilar alkyl groups.

Of course, as with alpha olefins mixtures of such olefins containing olefins with different numbers of carbon atoms can be used. It is also possible to use olefins of the general formula $RCH=CHR_1$ wherein R and $R_1$ are similar or dissimilar alkyl groups or mixtures containing a large proportion of such olefins, but appreciable yields are not obtained unless the catalyst component mole ratio (B:A) is less than about 0.5:1, preferably at about 0.3:1. As with other types of olefins mixtures of such olefins containing different numbers of carbon atoms in the molecule can be used.

To obtain a better polymerization reaction, it is preferable that the olefin should be purified or urea-extracted before polymerizing in the presence of the catalyst. One such method is purification using one of the catalyst components, for example treatment with a solution of titanium tetrachloride in which the precipitate formed on adding titanium tetrachloride to the olefin is removed by filtration. The filtrate is then washed successively with a dilute solution of hydrochloric acid, for example a 16 percent solution and aqueous sodium carbonate, for example 5 percent, and then distilled water. The olefin is then distilled from sodium.

In another method of purification, that is with sulfuric acid, the olefin, preferably after being deperoxidized by agitation with an acidified aqueous solution of ferrous sulfate, is cooled to and maintained at a temperature below 10° C. and concentrated sulfuric acid, for example 96 percent, is added dropwise to the vigorously agitated olefin. After removing the acid sludge layer more concentrated sulfuric acid is added under similar conditions. This procedure is repeated once more and after the third extraction the olefin is washed with water, dilute aqueous sodium hydroxide, for example 4 percent, and then water until neutral. The olefin is then treated with a drying agent, for example calcium chloride or dried, for example by the use of molecular sieves, and then distilled under a reduced pressure of about 1 mm. mercury from sodium.

It is also possible to combine the purification treatments, e.g., by washing with sulfuric acid followed by treatment with titanium tetrachloride.

For straight-chain alpha olefins or mixtures containing a large proportion of straight-chain olefins it is preferable that the olefin be treated with urea. Thus, the olefin or olefin mixture is treated with urea, preferably in aqueous, alcoholic or aqueous-alcoholic solution to form a slurry or complex comprising the adduct. In a preferred modification the adduct is formed and separated in the presence of a wetting agent, for example sodium alkyl sulfates having from 8 to 19 carbon atoms in the alkyl group, and preferably water-soluble salts, for example ammonium salts, particularly ammonium carbonate, and potassium chromate. After separation of the top layer of unreacted raffinate hydrocarbon by gravity the adduct can be decomposed by heating to between 70° and 75° C. to yield as upper layer the purified olefin or olefin mixture. However, according to the preferred embodiment of the urea extraction, the adduct slurry (after removal of the raffinate hydrocarbon by separation under gravity) is stirred and washed with a solvent substantially immiscible in water for example toluene, or aliphatic or substantially aliphatic petroleum spirits. After settling the adduct slurry is separated from the solvent, e.g. toluene, phase and decomposed by heating to between 70° and 75° as before.

After urea extraction the olefin can be further treated, for example, by distillation over sodium, treatment with small quantities of one of the catalyst components, e.g. titanium tetrachloride or triethyl aluminum, or purification by treatment with sulfuric acid.

After purification the olefin may be washed with water and dried, for example over calcium chloride, or over molecular sieves.

According to the process of the present invention it has been found an advantage if the olefin or olefin mixture, whether or not it has been purified or urea-extracted by any one of the methods hereinbefore described, is further treated by purification with silica gel. This treatment, in many cases improves the yield of polymer and very often increases the viscosity of the polymer. According to this preferred embodiment therefore, the olefin, preferably having been dried, is treated with activated silica gel, for example by allowing the olefin to percolate through a column containing granules of silica gel, or by adding silica gel to form a slurry and obtaining the olefin as filtrate on filtering the slurry. The purified olefin thus obtained can then be dried, for example over molecular sieves.

It is also possible to purify the olefin merely by distillation and percolation through silica gel.

The polymerization is most conveniently carried out in a solvent medium, the solvent being substantially inert under the reaction conditions. Suitable solvents include saturated aliphatic hydrocarbons which are liquid under reaction conditions, for example, n-hexane, n-pentane, iso-octane, and n-decane and aliphatic or substantially aliphatic petroleum spirits. The preferred solvents are iso-octane and cyclohexane. If a solvent is not used when carrying out the polymerization as a batch process the reaction temperature is considerably higher and may in some cases become undesirably high. In a steady-state process this rise in temperature can be avoided or minimized by adding the olefin very slowly to the reaction zone.

In carrying out the reaction using this type of catalyst system an inert atmosphere in the reaction vessel is essential, otherwise the component B may decompose, reacting violently. Accordingly, preferably before adding the olefin and solvent to the reaction vessel an inert atmosphere is created by purging the vessel with a dry inert gas, for example nitrogen. The catalyst components dissolved in the inert solvent are then introduced into the vessel.

It has been found that a concentration of catalyst to olefin, such that the mole ratio of component A, for example titanium tetrachloride to olefin lies between 0.005:1 and 0.1:1, preferably between 0.015:1 and 0.04:1, is convenient. When mixtures of olefins containing olefins having different numbers of carbon atoms in the molecule are used it is to be understood that the molecular weight of the olefin is the theoretical mean molecular weight of the mixture.

According to the process of the present invention, it is essential that the mole ratio (B:A) be less than 1:1 and preferably between 0.05:1 and 0.9:1. With olefins or mixtures containing a large proportion of olefins having the general formula

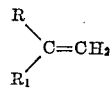

it is preferable that the mole ratio of compounds B:A should be between 0.05:1 and 0.6:1. When polymerizing olefins of the general formula $RCH=CHR_1$, it is preferable that the mole ratio of components B:A should be less than about 0.5:1 and more preferably at about 0.3:1.

When producing polymers especially from straight-chain alpha olefins or mixtures containing a large proportion of such olefins it is preferable to use lower catalyst component mole ratios for the higher olefins. Thus, for example, for olefins having at least six but not more than eight carbon atoms in the molecule the mole ratio should preferably be between 0.2:1 and 0.9:1. For olefins having at least nine but not more than thirteen carbon atoms in the molecule a mole ratio of between 0.05:1 and 0.6:1 is preferred, while for tetradecene and higher olefins a mole ratio between 0.05 and 0.5:1 is preferred. The same principles apply for mixtures of olefins.

It has been found that the temperature of reaction has quite a marked effect on the physical properties of the resulting polymer. In general increasing the temperature from, for example −25° C. to 150° C. increases the yield quite considerably, decreases the viscosity slightly, decreases the pour point and also decreases the Kinematic Viscosity Index (K.V.I.).

For an oil to be good as a lubricating oil it is desirable that it should have a low pour point and a high K.V.I., preferably 100 or greater. For a $C_{10}$ olefin polymerized and halogenated or sulfohalogenated according to the process of the present invention when the temperature of reaction is increased from about −25° C. to about 80° C. there is not much decrease in the K.V.I. but the pour point decreases by nearly 30° F. According to the process of the present invention therefore, it is preferable that the reaction temperature should be between about 70° C. and about 90° C. and more preferably about 80° C.

For reaction temperatures of about 80° C. and greater, an increase in reaction time, for example from 7 to 17 hours, produces only a small increase in yield and no significant change in the pour point or viscometric properties of the polymer. However, at lower reaction temperatures, for example 20° C., there is a significant increase in yield the longer the reaction time. In general, when polymerizing in the presence of a solvent, the reaction times can vary between about one hour and eight hours. Without a solvent the reaction time may be much shorter, for example 15 minutes.

The polymerization reaction can be carried out as a batch process or it can be adapted to the steady-state process. In this latter process a polymerization mixture of constant composition is continuously introduced into the reaction zone and the reaction mixture resulting from the polymerization is continuously withdrawn in amounts equivalent to the rate of introduction of reactants.

According to the process of the present invention, the polymer or reaction mixture containing polymer is contacted with a halogenating or sulfohalogenating agent. The polymer obtained by the polymerization as hereinbefore described in general contains unreacted catalyst, and catalyst residues. Furthermore, where a solvent has been used, the polymer may be present in solution. It is possible to contact the polymer with halogenating or sulfohalogenating agent by treatment at any one of the following three stages, i.e. by treating (1) the reaction mixture containing polymer before the residual catalyst has been inactivated and before the catalyst residues have been removed; or (2) the reaction mixture containing polymer after the residual catalyst has been inactivated, but before the catalyst residues have been removed; or (3) the reaction mixture containing polymer after the residual catalyst has been inactivated and after the catalyst residues have been removed. Where during polymerization a solvent is present it may if desired be removed, entirely or partially before treating the polymer at any one of the three above-mentioned stages. Separation of the polymer from the solvent may be carried out for example, by distillation, preferably under reduced pressure. Since, however, the halogenation or sulfohalogenation is suitably carried out in the presence of a solvent, preferably the same solvent as used in the polymerization, removal of solvent is not necessary. The preferred solvent in which the polymer or reaction mixture containing polymer is dissolved during halogenation or sulfohalogenation is iso-octane or cyclohexane.

When contacting the polymer-containing reaction mixture at stage (1), the halogenation or sulfohalogenation in addition to introducing halogen or halogen and sulfur groups respectively also inactivates the catalyst and decomposes the catalyst residues.

Inactivation of the catalyst, as required before stages (2) or (3) are reached, can be accomplished by washing with an alcohol, water or other suitable material, for example methanol, isopropanol or mixtures thereof. Sometimes, the catalyst inactivation also removes a major proportion of the catalyst residues, but when it is necessary to remove the catalyst residues, as required before stage (3) is reached, they can be removed by treating the polymer with an acid, or base, for example dilute hydrochloric acid, followed by sodium carbonate solution. When contacting with halogenating or sulfohalogenating agent at stage (2) it is preferable that alcohol, if used, be removed first, otherwise appreciable quantities of alkyl halide will be formed when introducing the halogen or halogen and sulfur groups into the polymer. This removal can be effected by separating the two layers which are formed after washing the polymer reaction mixture, and collecting the desired solvent layer containing polymer.

According to the process of the present invention halogen itself can be used as halogenating agent, preferably one gaseous or liquid at normal temperatures and pressures. The most preferred halogen is chlorine gas.

Preferred sulfohalogenating agents according to the present invention are the thionyl or sulfuryl halides, particularly thionyl chloride or sulfuryl chloride. Other sulfohalogenating agents which can be used include the sulfur monohalides or dichlorides, for example sulfur monochloride.

The amount of halogen if a halogenating agent only is used, or of halogen and sulfur if a sulfohalogenating agent is used, which is introduced in the polymer is small, i.e. less than about 10 percent and preferably less than 5 percent by weight.

When treating the isolated polymer, suitably dissolved in solvent, or the reaction mixture containing polymer therefore, the weight (expressed in terms of halogen content) of halogenating agent or sulfohalogenating agent added should be between 1 percent and 30 percent of the polymer contacted.

The time for which the polymer or reaction mixture containing polymer is contacted is preferably at least two hours and more preferably between four and six hours. It is preferable to add the halogenating agent or sulfohalogenating agent over a period of time for example half an hour.

After halogenation or sulfohalogenation the polymer is preferably treated with aqueous carbonate or bicarbonate solution for example 5 percent by weight aqueous $NaHCO_3$ or 5 percent by weight aqueous $Na_2CO_3$ solution. The polymer can then be separated from solvent (if present) and purified by distillation preferably under reduced pressure.

When, however, the polymer has been contacted with halogenating or sulfohalogenating agent at stage (1) the catalyst residues should be removed first before treatment with aqueous carbonate or bicarbonate solution. This can be accomplished by washing with water or dilute acid, for example hydrochloric acid.

According to a preferred feature of the present invention the dimer and if necessary other low molecular weight polymer is removed for example by distillation under reduced pressure. In this manner the volatility of the resulting polymer is quite considerably reduced.

The preferred method of removing the dimer and other low molecular weight polymer is by fractional distillation under reduced pressure. The low boiling fraction comprising the dimer and in some cases other low molecular weight polymer is removed, leaving the desired halogenated or sulfohalogenated polymer in the residue.

Although in this manner, the dimer and other low molecular weight polymer can be conveniently removed after treatment with halogenating or sulfohalogenating agents, in the cases where the isolated polymer is treated it is possible and in some cases preferable, to remove them before the said treatment. In these cases, they are conveniently removed after first distilling off the solvent used in the polymerization reaction.

In both cases, removal of dimer and other low molecular weight polymer from the halogenated or sulfohalogenated polymer either before or after halogenation or sulfohalogenation generally results in a polymer with a reduced pour point.

An advantage of the polymers of the present invention which can be used as lubricating oils having good extreme pressure properties is that at low temperatures, for example 0° F., their viscosity does not rise rapidly as the temperature is reduced and is appreciably lower therefore than, for example, that of polyoxyalkylene fluids or of mineral oils having a similar viscosity at normal temperatures.

Although the polymers produced by the process of the present invention are satisfactory as lubricating oils per se they may of course be blended with any other mineral or synthetic oil having lubricating properties. Such oils may be for example a hydrocarbon oil obtained from a praffinic, naphthenic, Mid-Continent or Coastal Stock or mixtures thereof.

The polymers may also be blended with synthetic lubricating oils, for example copolymers of alkylene glycols and alkylene oxides; organic esters, e.g. di(2-ethylhexyl)sebacate, dinonyl sebacate, dinonyl adipate, dioctyl phthalate and tricetyl phosphate; polymeric tetrahydrofuran and polyalkyl silicone polymers, e.g., dimethyl silicone polymer.

Although the polymers of the present invention are preferably blended with only synthetic lubricating oils, especially diester or polyoxyalkylene lubricating oils, the final blend may comprise any number of suitable oils having lubricating properties.

For certain applications, polymers produced by the process of the present invention or blends of such polymers with oils having lubricating properties require the addition of additives such as pour point depressors, viscosity index improvers, thickeners, antioxidants, anti-corrosive agents and anti-lacquering agents.

Suitable additives which function as pour point depressors and viscosity index improvers include polymers of esters of acrylic acid or a 2-alkylacrylic acid, for example, the polymers of the methyl, ethyl, n-propyl, isopropyl, isobutyl, lauryl, phenyl, or benzyl esters.

Suitable anti-lacquering agents for addition to the polymers produced by the process of the present invention are the salts of aromatic carboxylic acids or of phenols with a metal of group II of the periodic table, which salts are soluble in the synthetic oil. Examples of such salts include the zinc and calcium salts of benzoic acid, naphthenic acid, phenol, the higher alkylate phenols and higher alkylated salicylic acids.

Although the polymers obtained by the process of the present invention have extreme pressure properties per se, if desired, an extreme pressure additive may also be added to the polymers of the present invention. A good type of extreme pressure additive is the trialkyl, triaryl or trialkaryl phosphates, for example trioctyl or tricresyl phosphates.

Antioxidants, for example the alkylated phenols and diphenols and phenothiazine and its alkyl or aryl alkyl substitution products, for example 10-benzyl phenothiazine may also be added to the polymers of the present invention. It is found that the resulting lubricating oil has great oxidation stability.

In the following examples the relationship between parts by weight and parts by volume is the same as that between the gram and the cubic centimeter.

EXAMPLE I

Thirty-five parts by weight of the polymer obtained by polymerizing 37 parts by weight of a urea-extracted $C_9$ cracked wax olefin cut, using an $AlEt_3:TiCl_4$ mole ratio of 0.3:1, and $TiCl_4$:olefin mol ratio of about 0.030:1, was dissolved in 35 parts by weight of iso-octane and heated to 80° C. In the first run 10 parts by volume of thionyl chloride was added to the polymer over half an hour and the reaction mixture was agitated at about 80° C. for a further 3½ hours. In the second run instead of thionyl chloride, the same quantity of sulfuryl chloride was used. The sulfo-chlorinated polymer obtained in each run was washed with 5 percent by weight aqueous $NaHCO_3$ dried and topped at 190° C. and 0.4 mm. pressure for ¾-hour.

Polymers suitable as lubricating oils having good extreme pressure properties were obtained having the following properties.

Table 1

| Reagent | Viscometric Properties | | | Percent S | Percent Cl |
|---|---|---|---|---|---|
| | $V_K$, 100° F., cs. | $V_K$, 210° F., cs. | K.V.I. | | |
| $SOCl_2$ | 82.9 | 12.9 | 138 | 1.3 | 0.6 |
| $SO_2Cl_2$ | 128 | 15.7 | 124 | 0.3 | 10.2 |

EXAMPLE II 600 parts by weight $C_{12}$ cracked wax olefins cut treated with urea and further treated by distillation and percolation over silica-gel was polymerized using an $AlEt_3$ to $TiCl_4$ mole ratio of 0.3:1. No solvent was used and the maximum temperature caused by the heat of reaction was about 100° C. After the reaction had proceeded for about five hours the reaction mixture was treated over 25 minutes at about 80° C. with 50 parts by volume of thionyl chloride. After washing with water and then aqueous sodium carbonate solution the product was topped to remove monomer and light ends including some dimer.

A polymer suitable as a lubricating oil having the following properties was obtained.

$V_K$ 100° F. (cs.) _____ 179
$V_K$ 210° F. (cs.) _____ 22.8
K.V.I. _____ 132

The chlorine content was 1.9 percent by weight and the sulfur content was 1.9 percent by weight.

This polymer blended in a lubricating oil was then subjected to the IAE gear rig test to measure the extreme pressure properties of the polymer. The results were as follows:

Table 2

Scuffing load at 110° C. and at—

Lb.
2000 r.p.m. _____ 150
6000 r.p.m. _____ 110

Thus the polymer had good extreme pressure properties.

EXAMPLE III

Two polymers were prepared substantially as described in the preceding example utilizing two different mixtures of olefins as the starting materials. These were compared with a high viscosity index mineral oil matching the viscosity of the two polymers so produced. The viscosities and scuffing loads of these oils are given in Table 3 which follows:

Table 3

| Material | Viscosity at 140° F., cs. | Scuffing Load, lb. | |
|---|---|---|---|
| | | 60° C., 2,000 r.p.m. | 110° C., 6,000 r.p.m. |
| $C_{9-17}$ Polymer, dewaxed | 21.5 | 70 | |
| HVI mineral oil | 21.5 | 60 | |
| $C_{9-10}$ Polymer | 47.5 | 60 | 40 |
| HVI mineral oil | 47.5 | 72 | 36 |

We claim as our invention:

1. A process for the production of a lubricating oil which comprises polymerizing alpha-olefins having 6–18 carbon atoms per molecule in the presence of a catalyst comprising aluminum triethyl and titanium tetrachloride, the mol ratio of aluminum triethyl to titanium tetrachloride being between about 0.05:1 and about 1:1 at a temperature between about −25° C. to about 150° C. whereby a polymeric product is formed, and reacting the product with 1–30% by weight of thionyl chloride at a temperature of 60–100° C. whereby a lubricating oil containing between about 0.1 percent and about 10 percent by weight each of sulfur and chlorine substituents is formed.

2. A process for the production of a lubricating oil which comprises polymerizing alpha-olefins having 6–18 carbon atoms per molecule in the presence of a catalyst comprising an aluminum trialkyl and a titanium chloride, the mol ratio of trialkyl to chloride being between about 0.05:1 and about 0.9:1 at a temperature between about 70° C. and about 90° C. for a polymerization time between about 1 hour and about 8 hours, whereby a polymeric product is formed and reacting the product with 1–30 percent by weight of a sulfur-chloride at a temperature of 60–100° C. for 2–6 hours, whereby a lubricating oil having high viscosity index and extreme pressure properties is formed.

3. A process for the production of a lubricating oil which comprises polymerizing alpha-olefins having 6–18 carbon atoms per molecule in the presence of a catalyst comprising an aluminum trialkyl and a titanium chloride, the mol ratio of trialkyl to chloride being between about 0.05:1 and about 0.9:1 at a temperature between about 70° C. and about 90° C. for a polymerization time between about 1 hour and about 8 hours, whereby a polymeric product is formed and reacting the product with 1–30 percent by weight of chlorine at a temperature of 60–100° C. for 2–6 hours, whereby a lubricating oil having high viscosity index and extreme pressure properties is formed.

4. A process for the production of a lubricating oil which comprises polymerizing alpha-olefins having 6–18 carbon atoms per molecule in the presence of a catalyst comprising an aluminum trialkyl and a titanium chloride, the mol ratio of trialkyl to chloride being between about 0.05:1 and about 0.9:1 at a temperature between about 70° C. and about 90° C. for a polymerization time between about 1 hour and about 8 hours, whereby a polymeric product is formed and reacting the product with 1–30 percent by weight of a sulfur oxychloride at a temperature of 60–100° C. for 2–6 hours, whereby a lubricating oil having high viscosity index and extreme pressure properties is formed.

5. A process for the production of lubricating oils which comprises contacting alpha-olefins having 6–18 carbon atoms per molecule under polymerizing conditions with a catalyst comprising a mixture of components (B) and (A), (B) is an organo aluminum compound selected from the group consisting of trialkyl aluminum, dialkyl aluminum halide and alkyl aluminum dihalide, and in which (A) is a metal salt the metal portion of which is selected from the group consisting of iron, titanium, tin, lead, zirconium and vanadium and the acid portion of the salt is selected from the group consisting of a halide and an oxyhalide, the mol ratio of B:A being between 0.05:1 to about 1:1, and thereafter reacting the polymerized product with 1–30% by weight of a modifying compound of the group consisting of halogens, sulfur halides and sulfoxyhalides at a temperature between about 60 and 100° C. for a period of time between about 2 and about 6 hours, whereby a lubricating oil having high viscosity and extreme pressure properties is obtained.

6. A process according to claim 5 wherein the modifying compound is added to the polymerized reaction mixture containing catalyst residues and unreacted catalyst, whereby the catalyst residues are decomposed and the catalyst is deactivated in addition to modification of the polymerization product.

7. A process for the production of a lubricating oil which comprises polymerizing alpha-olefins having 6–18 carbon atoms per molecule in the presence of a catalyst comprising an aluminum trialkyl and a titanium chloride, the mole ratio of trialkyl to chloride being between about 0.05:1 and about 0.9:1 at a temperature between about 70° C. and about 90° C. for a polymerization time between about 1 hour and about 8 hours, whereby a polymeric product is formed, and reacting the product with 1–30% by weight of sulfuryl chloride at a temperature of 60–100° C. for 2–6 hours, whereby a lubricating oil having high viscosity index and extreme pressure properties is formed.

No references cited.